US011321299B2

(12) United States Patent
Bortnikov et al.

(10) Patent No.: US 11,321,299 B2
(45) Date of Patent: May 3, 2022

(54) SCALABLE CONFLICT DETECTION IN TRANSACTION MANAGEMENT

(71) Applicant: Yahoo Holdings, Inc., Sunnyvale, CA (US)

(72) Inventors: Edward Bortnikov, Haifa (IL); Ohad Shacham, Kfar Monash (IL); Idit Keidar, Haifa (IL)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 883 days.

(21) Appl. No.: 15/012,250

(22) Filed: Feb. 1, 2016

(65) Prior Publication Data

US 2017/0220617 A1 Aug. 3, 2017

(51) Int. Cl.
*G06F 16/23* (2019.01)

(52) U.S. Cl.
CPC ................ *G06F 16/2329* (2019.01)

(58) Field of Classification Search
CPC ............ G06F 16/2329; G06F 16/2315; G06F 16/2308
See application file for complete search history.

(56) References Cited

U.S. PATENT DOCUMENTS

| 9,021,303 | B1* | 4/2015 | DeSouter | G06F 11/1417 |
| | | | | 714/15 |
| 2004/0083347 | A1* | 4/2004 | Parson | G06F 17/30949 |
| | | | | 711/165 |
| 2004/0236746 | A1* | 11/2004 | Lomet | G06F 16/2322 |
| 2005/0013181 | A1* | 1/2005 | Adelmann | G06F 12/0862 |
| | | | | 365/200 |

(Continued)

OTHER PUBLICATIONS

H. Berenson, P. A., Bernstein, J., Gray, J., Melton, E. J. O'Neil, and P. E. O'Neil., "A critique of ANSI SQL Isolation Levels," In M. J. Carey and D. A. Schneider, editors, Proceedings of the 1995 ACM SIGMOD International Conference on Management of Data, San Jose, California, May 22-25, 1995., pp. 1-10, ACM Press, 1995 (13 pp.).

(Continued)

*Primary Examiner* — Charles D Adams

(57) ABSTRACT

Multi-thread systems and methods are described for concurrently handling requests to commit data updates to a database by a plurality of data transactions. The database preferably supports multi-versioning and the data transactions are preferably isolated by snapshot isolation. In one embodiment, concurrent and lock-free handling of requests to commit data updates includes performing two types of concurrent data conflict detection. A transaction proceeds to commit only if it passes both types of conflict detection. The first type of conflict detection is based on a hash map between data keys and their commit timestamps whereas the second type of conflict detection is based on a log that keeps track of the status of transactions whose requests to commit are actively being processed. In another embodiment, concurrent conflict detection for data items in concurrent transactions is broken down into buckets and locks are used for accessing each bucket. These systems and methods maintain transactional integrity to database while improving throughput by maximizing concurrency of data commits in a multi-thread environment.

25 Claims, 13 Drawing Sheets

(56) References Cited

U.S. PATENT DOCUMENTS

| | | | | |
|---|---|---|---|---|
| 2010/0332753 | A1* | 12/2010 | Gray | G06F 1/3225 |
| | | | | 711/118 |
| 2011/0209155 | A1* | 8/2011 | Giampapa | G06F 9/5016 |
| | | | | 718/103 |
| 2012/0239869 | A1* | 9/2012 | Chiueh | G06F 12/0246 |
| | | | | 711/103 |
| 2013/0110883 | A1* | 5/2013 | Junqueira | G06F 17/30353 |
| | | | | 707/803 |
| 2013/0242425 | A1* | 9/2013 | Zayas | G06F 3/064 |
| | | | | 360/15 |
| 2017/0068700 | A1* | 3/2017 | Sapa | G06F 17/30377 |

OTHER PUBLICATIONS

D. G. Ferro, F. Junqueira, I. Kelly, B. Reed, and M. Yabandeh. "Omid: Lock-Free Transactional Support for Distributed Data Stores," In I. F. Cruz, E. Ferrari, Y. Tao, E. Bertino, and G. Trajcevski, editors, IEEE 30th International Conference on Data Engineering, Chicago, ICDE 2014, IL, USA, March (12 pp.).

Michael F. Spear, Maged M. Michael, and Christoph von Praun, RingSTM: Scalable Transactions with a Single Atomic Instruction, http://citeseerx.ist.psu.edu/viewdoc/download?doi=10.1.1.528.2519&rep=rep1&type=pdf, pp. 275-284 (10 pp.).

* cited by examiner

Figure 6

| TxId | Time Overlap | Spatial Overlap (WriteSet Rows) |
|---|---|---|
| T1 | → | R1    R3 |
| T2 | → | R2    R4 |
| T3 | → | R3  R4 |
| T4 | → | R1  R2  R3  R4 |

US 11,321,299 B2

SCALABLE CONFLICT DETECTION IN TRANSACTION MANAGEMENT

BACKGROUND

Access to databases or other data stores may be managed in groups of transactions. A single transaction consists of one or more data access operations, each reading and/or writing information to a database or data store. In a system that supports concurrency, different transactions may read and update the same data items in a database or a data store, causing potential data conflict. Databases and data stores which treat the integrity of data as paramount must be capable of detecting potential conflict between concurrent transactions and maintain data integrity. To improve system throughput, it is desired that the transaction management for a data access system take full advantage of the concurrency support.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 6 illustrate various scenarios for data conflict between transactions in snapshot isolation;

DETAILED DESCRIPTION

Figure 1:
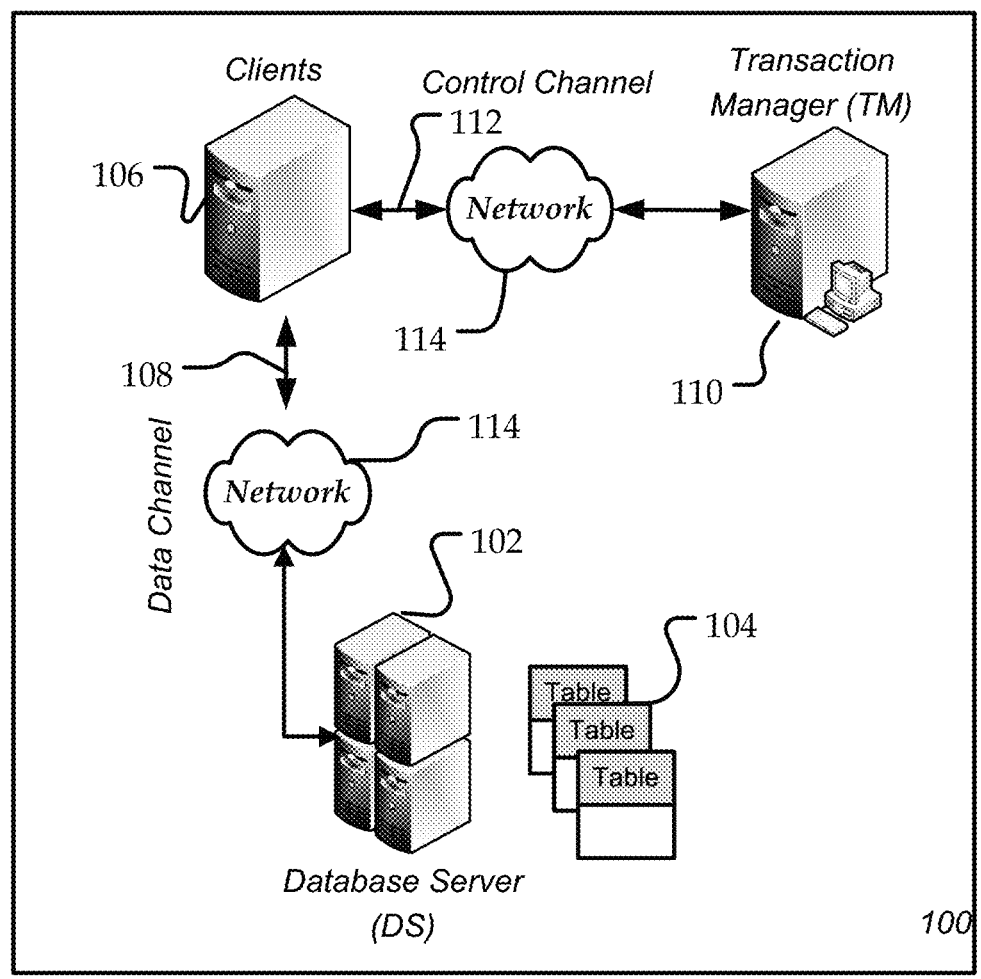
FIG. 1 shows a database access system supporting data transactions.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

By way of introduction, a database stores persistent data items on a single or a plurality of distributed servers and offers data services to its clients. Persistent data refers to digital information stored in non-volatile media. A database may contain relational or non-relational data tables well understood by a person of ordinary skill in the art of computer data processing. Examples of relational database include Oracle, MySQL, IBM DB2, dBase, and Microsoft SQL. Examples of non-relational database include Apache HBase, Google Bigtable, Clusterpoint, and Oracle NoSQL Database. Data services provided by a database is persistent and reliable (thanks to the use of replication), whereas in many applications clients of databases may be ephemeral, i.e., they may be alive only when performing data access operations and may fail at any time.

Data tables in a database may be accessed by multiple clients simultaneously, creating potential read and write conflict and data inconsistency. In particular, a client may update a data item in the middle of the data operations of a second client which also accesses the same data item, leading to data inconsistency for the second client. To help avoid such problems, client data accesses may be conveniently grouped into and managed as transactions. Each transaction may include a series of database access operations that, as a group, may be provided transactional support that allows the transaction to be concurrently executed with other transactions and at the same time be provided atomicity, consistency, isolation, and durability (ACID). Various databases may or may not provide direct transactional support. For example, most relational databases do support transactions but many non-relational databased do not provide native transactional support. It is desirable to provide transactional support for non-relational databases even though in many situations the clients of non-relational databases are transient or ephemeral. Transient and ephemeral transactions whose ACID is violated may be let fail and abort.

FIG. 1 shows a system 100 that provides transactional access to data. Database or database servers 102 store a large collection of persistent data items in the form of a plurality of data tables 104. Clients or client devices 106 interact with the database 102 for data access on a transactional basis through a data channel 108. Clients 106 further interact with a Transaction Manager (TM) 110 for transactional support via a control channel 112. Both the data channel 108 and the control channel 112 may be based on conventional communications networks 114 well known in the art. Although both networks may be the same network 114, they may also be different networks. In some embodiments, two or more of the database 102, clients 106, and the TM 110 may reside on one physical platform and the communications between them may be inter-process rather than inter-machines.

Clients 106 can be any machine or process that needs access to the database. For example, clients 106 may be a data source supplying data entries into the data tables. Clients 106 may alternatively be a data consumer that reads data from the database 102, processes the data, and provides services to third parties. Further, clients 106 may need to update data items in the database following data processing. Those of ordinary skill in the art understand that clients 106 are not limited to the embodiment described above and may conduct a combination of various types of tasks that may require access to database 102. For example, a client 106 may be a large processing task between content feeds and serving systems, e.g., a document processing task for Web search that consumes an HTML page's content and produces multiple new features for this page (term postings, hyperlinks, clickable text phrases named anchortext, and more). An example of a large processing hub that spawns client tasks to database systems is Sieve, a content management platform that powers the next-generation search and personalization products at Yahoo!.

Figure 2:
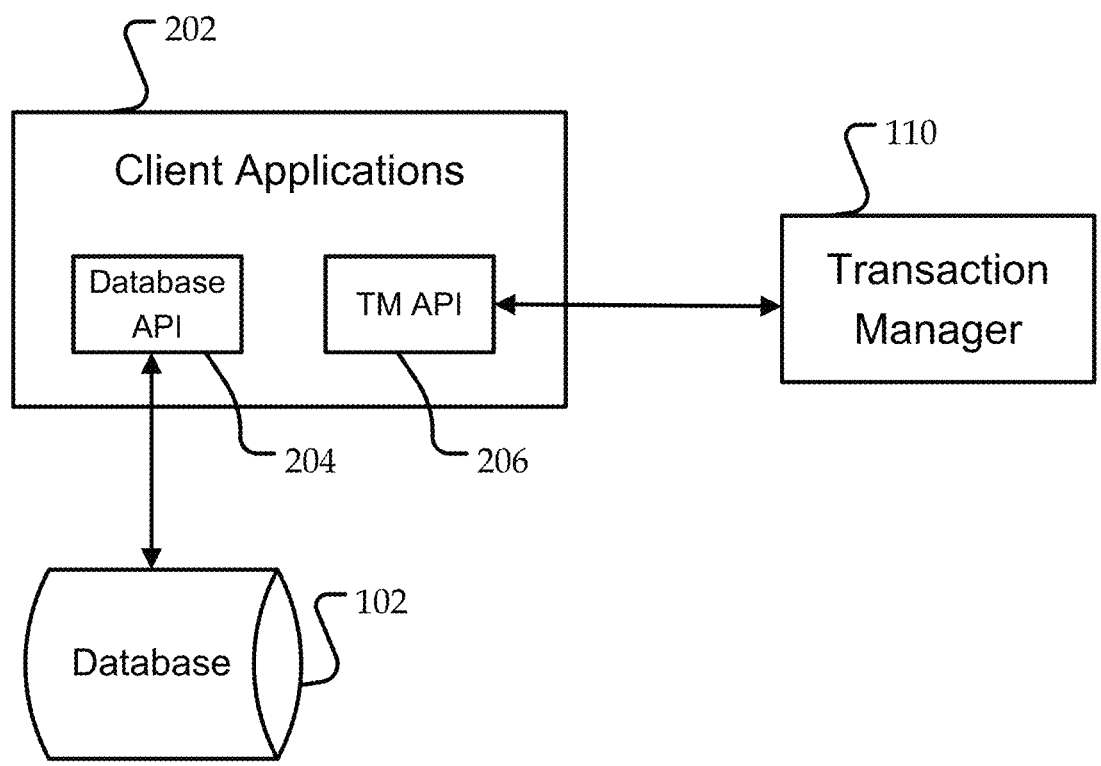
FIG. 2 shows a more detailed block diagram for the database access system of FIG. 1.

Turning to FIG. 2, client applications 202 residing with clients 106 may access the database through an Application Program Interface (API) to the database 102. The database API 204 may provide the basic data access functions to the clients. For a typical non-relational database, these basic functions include reading data items from and writing data items to the database in an exemplary form of function calls such as get(key) and put(key, val), where "key" uniquely identify a particular data item in the database and "val" is the value to be written into the database for the data item identified by "key".

The TM 110 further provides an API 206 to the clients for transactional support. For example, a client application may request service of the TM by creating a transaction identified by a unique transaction identifier, txid, and request a commencement of transactional support via a function call to the TM API, such as begin(txid). A client transaction within a client application 202 includes a set of database operations involving multiple get and put function calls as described previously. Multiple clients or even a single client in a multithread operating environment may need to concurrently run multiple transactions that access data items identified by the same set of keys. Transactions are concurrent when portions of their execution overlap in time. Thus, updating a certain data item by one transaction after a read of the same data item by a second transaction that is still on-going may potentially lead to data inconsistency for the second transaction. As will be described in more detail later, to guarantee transactional ACID, it may be paramount to ensure that each transaction is executed as a logically indivisible (atomic) unit, in isolation from other units, with predictable results. The TM 110 keeps track of active transactions and helps maintain ACID when the transactions are concurrently executed.

TM may be critical, particularly for databases with no native transactional support, because manually handling all possible race conditions and failure scenarios that could arise in concurrent execution by each individual client application may be prohibitively complex. In the embodiment illustrated in FIGS. 1 and 2, the TM is advantageously separate from the clients and provides a simple interface for the creation, management and conflict checks of transactions, saving client applications from having to deal with the details of complex race conditions and data conflicts.

To maintain isolation of transactions as part of the ACID requirement, the TM and the database may provide a mechanism for preventing concurrently executing transactions from seeing each other's partial updates. Each transaction may update a version of their set of data items that they update, the write set, which is isolated from other transactions. The isolation property is essential for data consistency. Informally, it ensures that the information a transaction reads from the database makes sense in that it does not mix old and new values. For example, if a transaction updates the reverse-anchortext feature of multiple pages linked-to by a page being processed, then no concurrent transaction may observe the old value of that feature for some of these pages and the new value for the rest. More formally, a system satisfies a consistency model if every externally observable execution history can be explained as a sequence of legal database state transitions.

Thus, transactions are isolated from seeing each other's partial updates while being executed. To maintain such isolation, a transaction is allowed to commit its update to the database, or make its update available to later transactions, only after it is completed and passes data conflict checks.

The isolation of transactions may be based on either serializability or snapshots. The former ensures that transactions appear to execute sequentially. The latter, the snapshot isolation (SI), as will be explained further in the embodiments below, enforces a total order on all transactions according to the time they write to and update the database permanently, the commit timestamp, ts_w, so that (1) each transaction sees a consistent snapshot of the database reflecting exactly those transactions that committed prior to its start time, ts_r (timestamp for the data version being read by each transaction); and (2) a transaction commits updates permanently only if no updates it has made conflict with any concurrent updates made since that snapshot.

Figure 3:
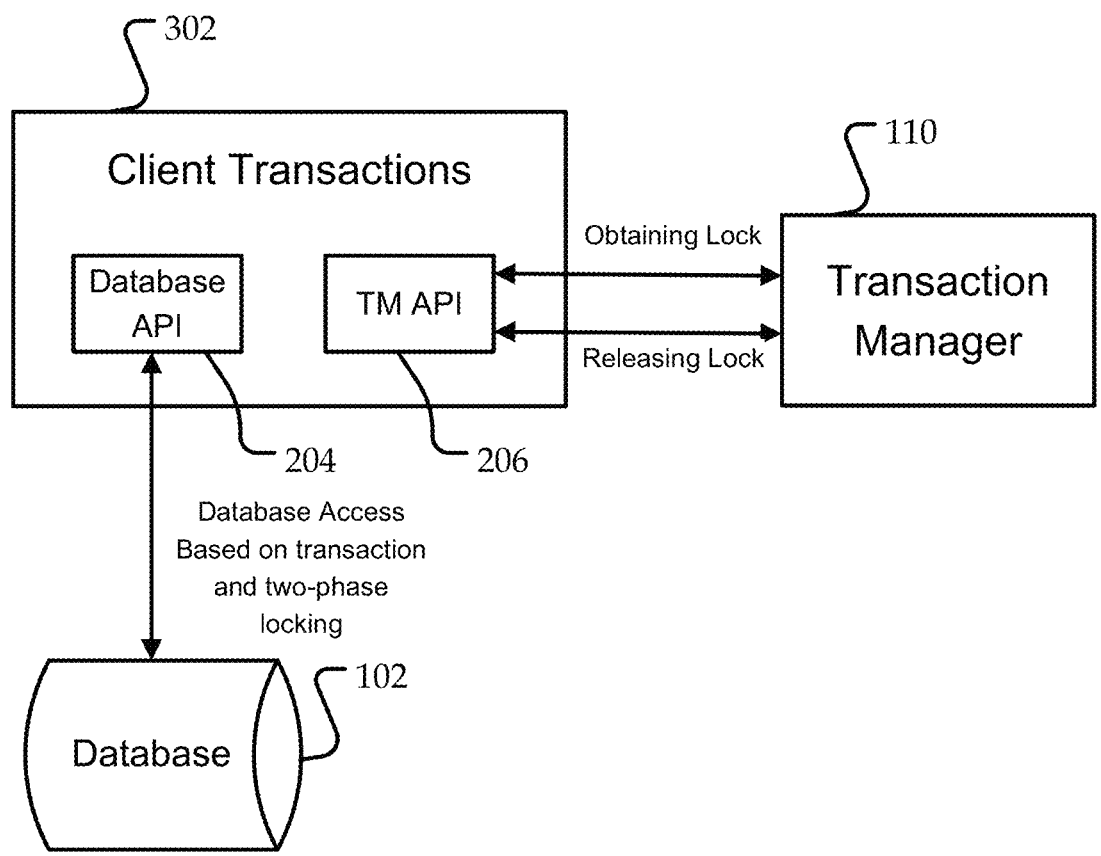
FIG. 3 shows the block diagram for a database access and transaction management system based on serializability isolation of transactions.

In the embodiment shown in FIG. 3, the isolation is implemented based on serializability which guarantees that the outcome of any parallel execution of transactions 302 can be explained by some serial order. In other words, transactions seem to be executing sequentially without overlapping in time (or alternatively, every transaction can be reduced to a point in time when it takes effect). In particular, FIG. 3 shows an embodiment of serializability isolation implementation based on two-phase locking methods. In a nutshell, a client transaction may first obtain a lock for accessing a particular data item in the database and release the lock when the transaction is completed and the data item is updated. Other transactions may not access the data until the lock has been released. Only transactions that do not have overlapping write sets may be executed in complete concurrency. Those skilled in the art understand that the locks can be applied and removed in two phases, namely, an expanding phase and a shrinking phase. In addition, the lock may be exclusive or shared. Further, various mechanisms may be employed to remove deadlock caused by mutual blocking that stalls transactions. Without a unique read snapshot, both the write set and read set of a transaction after being executed in serializability isolation may conflict with other transactions and thus necessitate conflict detection and locks for both the write set and read set, as will become clearer later in this disclosure.

Figure 4:
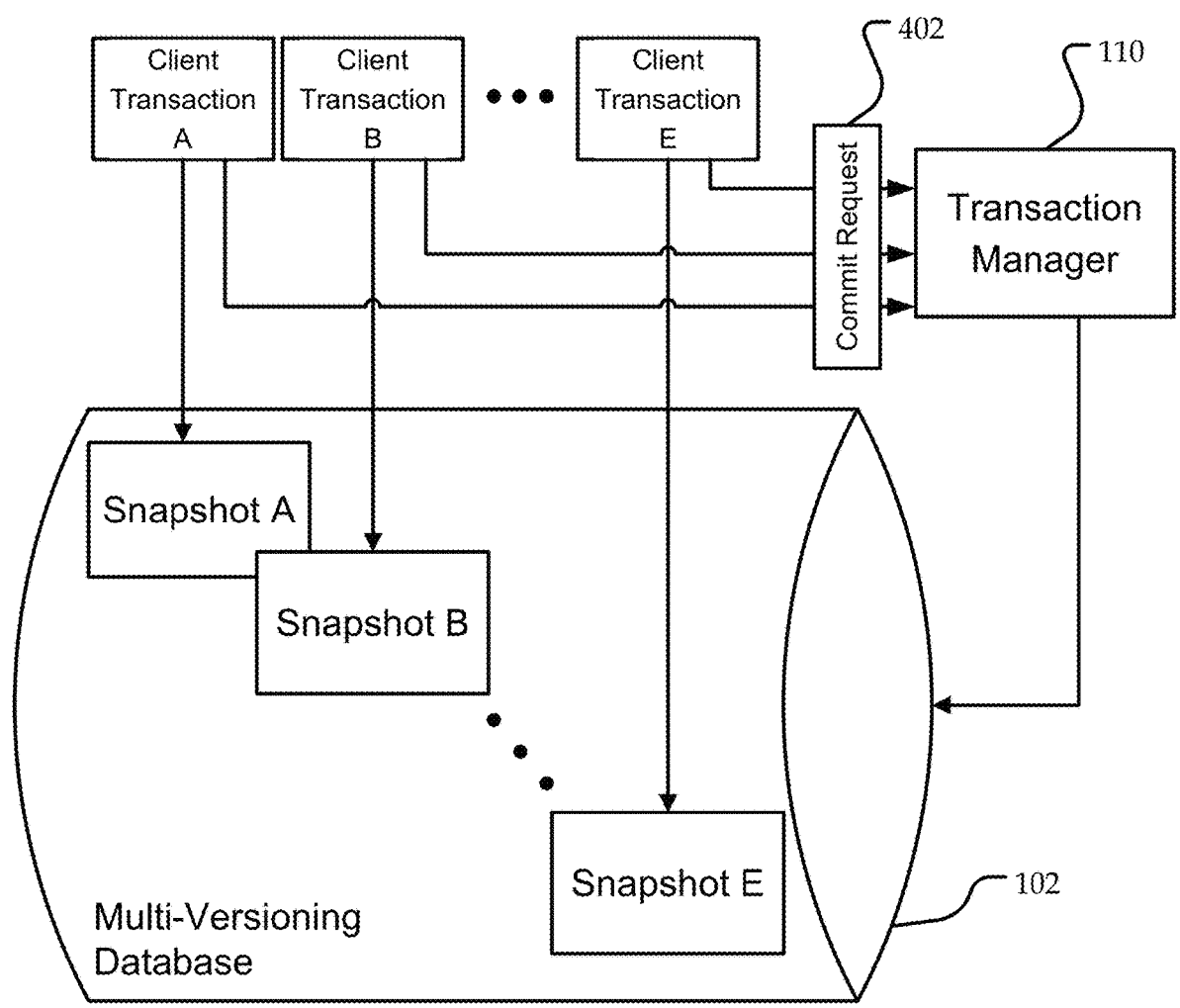
FIG. 4 shows the block diagram for a database access and transaction management system based on snapshot isolation of transactions.

In another embodiment shown in FIG. 4, transaction isolation may be implemented based on SI that is lock-free. SI may be conveniently implemented in popular database technologies that natively support data versioning, such as Oracle, PostgreSQL, Microsoft SQL Server, and Hbase. The TM 110 may utilize the database versioning support in the transactional context and provide SI for transactions, as will be explained later in some detailed embodiments. In the illustrative embodiment of FIG. 4, the database 102 maintains versions of each data item when it is written by clients. With the help of the TM, each client transaction A-E thus sees a corresponding snapshot of snapshots A-E of the data it reads by keeping timestamps for writes and writing different versions of the data in the multi-versioning database that other transactions do not see. Although FIG. 4 illustrates five transactions and five corresponding snapshots (Snapshot A-E), that is merely exemplary and there may be more or fewer. Unlike isolation based on serializability, SI allows transactions to be reduced to two points instead of one: a reading point and a writing point. Inconsistent reads do not occur, since each transaction sees a consistent snapshot of the database. For two concurrent transactions T1 and T2 isolated by snapshots, T1 sees either all of T2's updates to data items it is reading, or none of T2's updates. An SI implementation may require that (1) all reads in a transaction see a consistent snapshot of the database, and (2) a transaction successfully commits only if no update it has made conflicts with any concurrent updates made since that snapshot. The update by each transaction is only made permanent in the database and be seen by later transactions by sending a commit request 402 to the TM and being permitted by the TM to commit after conflict detection. Unlike isolation based on serializability, conflict detection only needs to be carried out for write sets in SI since data read is always consistent in SI.

Figure 5:
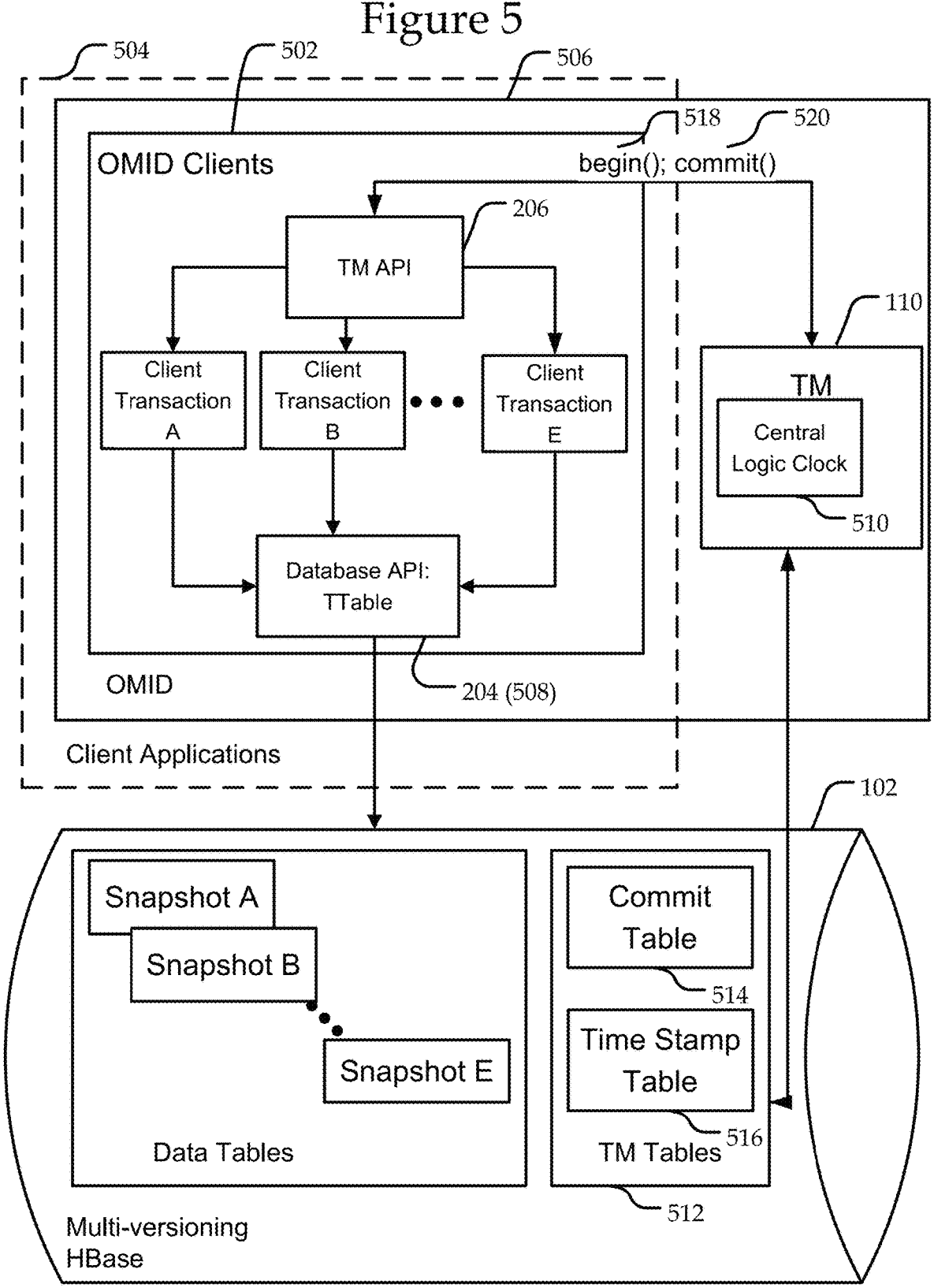
FIG. 5 shows the block diagram for a database access and transaction management system based on snapshot isolation of transactions in Yahoo! Omid and Apache HBase.

FIG. 5 illustrates an exemplary implementation of SI for managing transactions in Yahoo!'s Omid system that interworks with Apache HBase. Omid leverages the multi-versioning support in the underlying HBase key-value store, which allows transactions to read consistent snapshots of changing data as needed for SI. The snapshots (Snapshots A-E) are kept in database 102 for the corresponding transactions A-E. For multi-versioning, when the data item associated with an existing key is overwritten, a new version (holding the key, its new value, and a new version number) is created while the previous versions persist. An old version might be required as long as there is some active transaction that had begun before the transaction that overwrote this version has committed. Though it may take a while, overwritten versions eventually become obsolete. Omid takes advantage of HBase's coprocessors to implement a garbage-collecting algorithm in order to free up the disk space taken up by such obsolete versions when doing compactions.

Omid provides an SI implementation that scales far better than traditional serializability isolation based on two-phase locking approaches. Namely, transactions can execute concurrently until commit, at which time only write-write conflicts are resolved. Ties between two transactions that overlap both in time and in space (so committing both of them may violate ACID) are broken by aborting one of them, usually the one that attempts to commit later.

Specifically, Omid clients 502 spawn from the client applications 504 communicate with the TM 110 as part of Omid implementation 506 through the Omid TM API 206 for the creation, beginning, and committing of transactions A-E. The Omid clients communicate with the database through the database API 204. In some embodiments, Omid may provide an overlay on top of the HBase API to provide a database API 508 with transactional support. For example, Omid provides TTable which is essentially identical to the HTable of HBase except that each data access is associated with a transaction identifier.

One of the essential functions of the TM is generating version numbers (timestamps) for all client transactions. This is achieved by implementing a central logical clock 510 in the TM. In order to preserve correctness in shutdown/restart scenarios, the TM maintains an upper bound (maximum timestamp) of this clock in a reliable repository, which can be either an HBase table or a znode in Apache Zookeeper. As noted above, data resides in HBase and is multi-versioned. A data item's version number is tracked by the TM as the transaction identifier, txid, of the transaction that wrote it. The txid is returned by the TM in response to a begin call for a transaction.

Omid may also exploits HBase for storing persistent metadata needed for transaction management in existing data tables or Omid-specific HBase tables, which may come in two flavors. First, it augments each data item with a shadow cell, which indicates the commit status of the transaction that wrote it. Initially, when an item is written during a transaction, its shadow cell is set to tentative, i.e., potentially uncommitted. At commit time, the client obtains from the TM the transaction's commit timestamp and writes this timestamp to the shadow cells of its write set, which contains all the items written by the transaction. Further, Omid may manage additional HBase tables 512. For example, Omid manages a commit table 514 and a timestamp table 516 for tracking the commit timestamps of transactions. The data maintained in the commit table may be transient, being removed by the client when the transaction completes.

The unique txid of a transaction is produced by the begin function call 518 through the TM API. This txid is used by all subsequent requests. In Omid, txid also serves as the read (snapshot) timestamp and determines which versions of the data the transaction will read. The commit function call 520 through the TM API requests the TM to commit the updates by a transaction. Upon successful commit, the TM produces a commit timestamp, which determines the transaction's order in the sequence of committed transactions. All the transaction's writes are associated with this commit time (via the shadow cells). Note that both timestamps are based on the central logical clock 510 maintained by the TM.

In an exemplary embodiment, the Omid TM API 206 of FIG. 5 above may provide the following function calls for client transactions:

Begin: The client obtains from the TM a start timestamp ts_r that exceeds all the write timestamps of committed transactions. This timestamp becomes the transaction identifier (txid). It is also used to read the appropriate versions when reading data.

Get(txid, key): The get operation performs the following actions (in pseudo-code):
  scan versions of key that are lower than txid, highest to lowest
    if version is not tentative and is less than txid, return its value else, lookup the version's id in commit table
      if present (the writing transaction has committed) and version value is less than txid,
        update the commit timestamp and return the value else, re-read the version and return the value if no longer tentative and the version is less than txid. In case no value has been returned, continue to the next version.

Put(txid, key/value): Adds a new tentative version of the key/value pair and the txid as the version.

Commit(txid, writeset): The client requests commit from the TM for its txid, and provides in writeset the set of keys it wrote to. The TM assigns it a new commit timestamp and checks for conflicts for the transaction's writeset. If there are none, it commits the transaction by writing the (txid, commit timestamp) pair to the Commit Table. Then the TM returns the control to the client providing also this (txid, commit timestamp) pair. Finally, the client adds the commit timestamp to all data items it wrote to (so its writes are no longer tentative) and deletes the txid entry from the Commit Table.

Transactions use the read timestamp, ts_r, to ensure they read consistent versions from the table using get. They tentatively write using put with no final commit timestamp during their execution. When they complete, they access the TM in order to check if they can commit, and if yes, to obtain the commit timestamp ts_w. Finally, they update the elements they changed in the data table with their ts_w.

An example of client application code that implements SI through the API functions provided by Omid is shown below:

```
Configuration Conf=HBaseConfiguration.create( );
TransactionManager
    tm=HBaseTransactionManager.newBuilder( )
    .withConfiguration(conf)
    .build( );
TTable tt=new TTable(conf."EXAMPLE_TABLE");
byte[ ] family=Bytes.toBytes("EXAMPLE_CF");
byte[ ] qualifier=Bytes.toBytes("EXAMPLE_QUAL");
Transaction tx=tm.begin( );
Put      row1=new      Put(Bytes.toBytes
    ("EXAMPLE_ROW1"));
row1.add(family, qualifier, Bytes.toBytes("VALUE_1"));
tt.put(tx, row1);
Put      row2=new      Put(Bytes.toBytes
    ("EXAMPLE_ROW2"));
row2.add(family, qualifier, Bytes.toBytes("VALUE_2"));
tt.put(tx, row2);
tm.commit(tx);
tt.close( );
tm.close( );
```

The code above creates a client transaction, begins the execution of the transaction in SI, and then attempts to commit its updates for writing two rows of a data table.

In the SI embodiment above, when it is time for a transaction to make its updates in its write version available to other transactions, the client transaction makes a commit function call to the TM. Such a commit request initiates the critical function of the TM for detecting data write conflicts. If data conflict is detected by the TM, then one of the conflicting transactions (usually the later one to commit) is aborted and its updates disappear and will never be seen by other transactions. If there is no conflict, then the data updates by the transaction commits in the database and when a later transaction reads from the database for those data items, it will read the updated value as its snapshot.

Two transactions are in conflicts under SI if: 1) they execute concurrently (overlap in time); and 2) write to the same element of a particular row (spatial overlap in the database). This is illustrated in FIG. 6, where execution timeline of four different transactions T1 through T4 and the write set of each of these transactions are shown. In this example, transactions T1 and T2 overlap in time but not in space (their write sets do not contain modifications on the same items), therefore they are not in conflict and can both commit. T2 and T3 overlap in time and in space (both write to R4). Therefore one of them may be aborted to avoid consistency violation. T4 on the other hand, overlaps in space with all other transactions but does not overlap with any other transaction in time and thus does not conflict with the other three transactions and can commit.

Thus, in order to detect write conflicts, the TM may be able to map data keys to their latest commit timestamp such that the TM can look up keys for the write set of a transaction and compare the their latest commit timestamp to the start timestamp ts_r of the transaction. In an exemplary embodiment, the transaction is aborted if at least one of the keys for its write set corresponds to a latest commit timestamp that is later than ts_r of the transaction. However, the mapping of data keys to their latest commit timestamp does not need to be perfectly accurate—it is safe to overestimate the latest committed version of a key. Such overestimates can lead to unnecessary aborts, but not to consistency violation. Those of ordinary skill in the art understand that the mapping between active data keys and their latest commit timestamps can be implemented using a hash map. A hash map may be kept in one or more storages. The input of the hash function may be a data key and the output is an index pointing the corresponding latest commit timestamp (that may or may not be an overestimate). Such a hash map is updated with new commits. Using a hash map may yield false positive conflict detection but will not produce false negatives and consistency violations.

Figure 7:
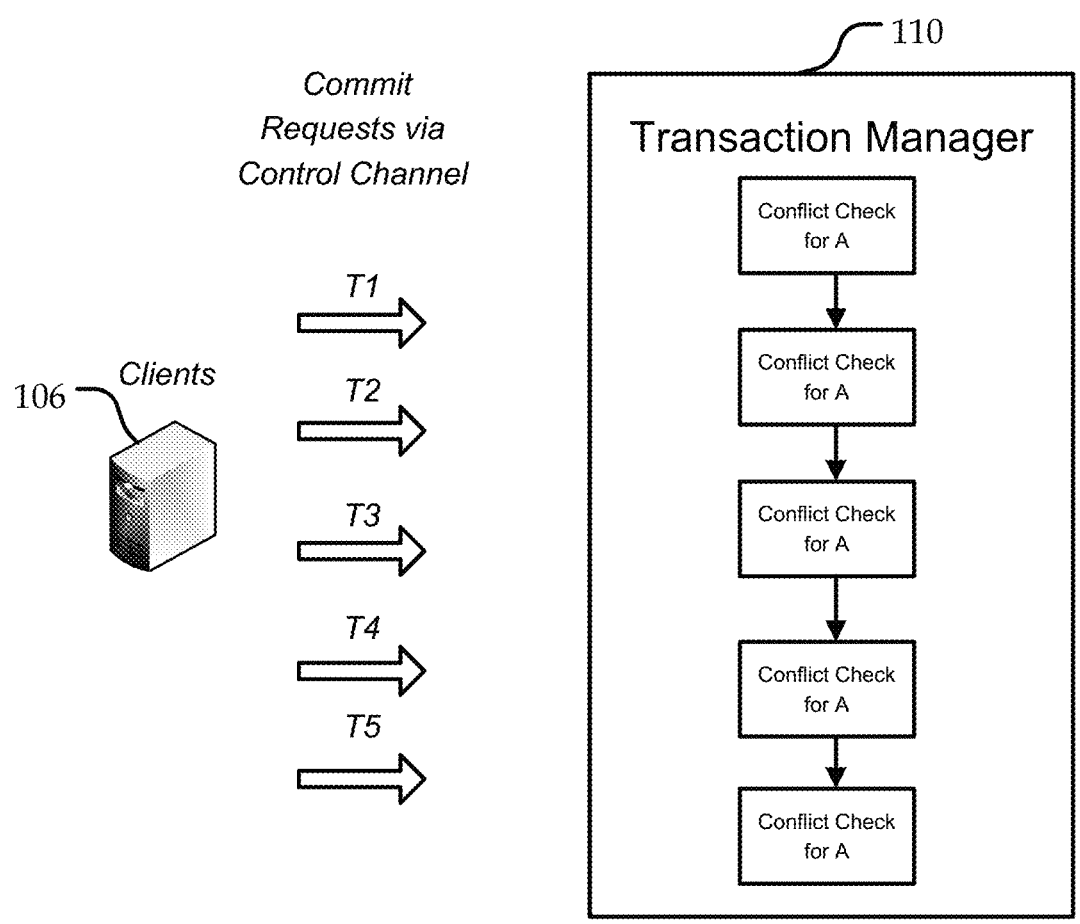
FIG. 7 shows an exemplary sequential conflict detection system for database transactions in snapshot isolation.

Conflict detection for multiple transactions may be carried out sequentially for maintaining ACID. In one embodiment, as illustrated by FIG. 7, the conflict detections can be done atomically by essentially removing their concurrency. In other words, upon receiving concurrent requests to commit transactions T1-T5, the TM would execute conflict detection for a transaction including the hash map lookup as a unit without other concurrent execution of request to commit from other concurrent transactions. In such a manner, requests to commit T1-T5 are executed in a sequential fashion by the TM. Sequential conflict detection may alternatively be implemented using a traditional two phase lock.

In sequential conflict detection in SI, the TM performs the following conflict detection for each transaction sequentially:

for each key in (T.writeset)
if hash map(key)>T.ts_r then return abort
//Following a successful check (i.e., if no conflicts are found), the TM proceeds
//to commit the transaction
ts_w←last_committed++//last committed transaction's commit timestamp
add T.writeset to hash map with ts_w
return ts_w The drawback of these sequential conflict detection implementations in SI is that they form a bottleneck for concurrent client transactions because the conflict check for each transaction are performed one after another even though the TM may be based on operating system that supports multi-thread operations. Considering that a vast majority of concurrent transactions do not conflict, sequential conflict detection methods incur serious performance bottleneck. Thus, it may be advantageous to use a parallel conflict detection scheme, where the requests to commit from concurrent transactions are executed concurrently to take full advantage of the multi-thread capability of the TM. Such an implementation provides scalability for increasing the number of client transactions by simply scaling the TM's multi-thread capabilities.

Figure 8:
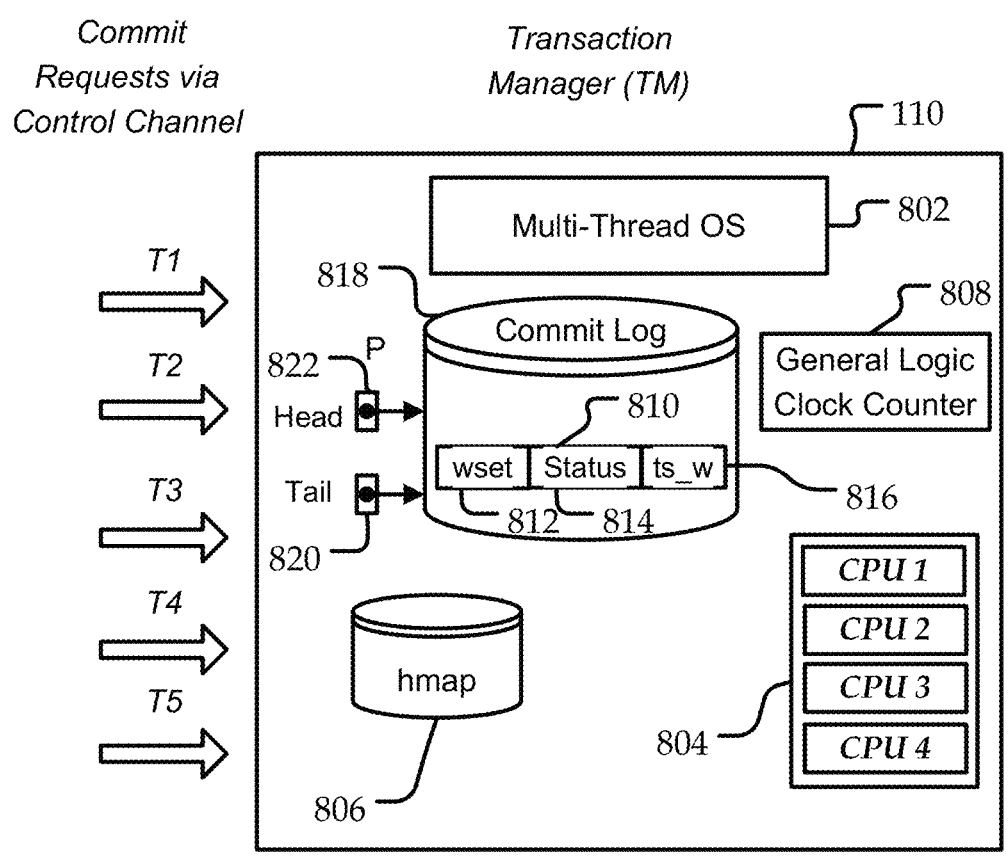
FIG. 8 shows an exemplary parallel and scalable conflict detection system for database transactions in snapshot isolation.

In the embodiment shown by FIG. 8, the TM 110 is capable of handling requests to commit concurrently rather than sequentially. The TM 110 receives concurrent requests to commit from a plurality of transactions T1 through T5. The TM 110 includes a multi-thread operating system (OS) 802 and may correspondingly include one or more processors 804. Each processor of 804 may include multiple CPU cores. The TM may alternatively be a distributed system across multiple hardware platforms. The TM keeps a hash map 806 in one or more storages. The storages may of any type of memory, volatile or non-volatile, including but not limited to random-access-memory, flash memory, magnetic disks, and optical disks. The TM also includes a counter 808 that keeps track of the general logic clock for the timing of beginning and committing of transactions. The TM 110 further maintains an additional data structure 810 for tracking each active commit request:

```
Record {          // active transaction record
    wset          // pointer to transaction's write set
    status        // can be started, committed, or done
    ts_w }        // commit timestamp
``` where wset 812 is a pointer to the transaction's write set, status 814 represents the various stages for the transaction in the commit process (e.g., started or done), and ts_w 816 holds the commit timestamp for the transaction after the TM has determined that the transaction is not in conflict with other transactions and can commit. When the TM receives a commit request from a transaction, a Record entry is made for the transaction with a status of started, meaning that the TM has commenced conflict detection for the transaction. In an exemplary embodiment, the TM modifies the status to done after it finishes conflict detection and has determined that that the transaction can either commit or abort. The commit timestamp ts_w is derived from the counter 808 after the conflict detection is concluded for the transaction.

A commit log 818 is maintained in one or more storages by the TM that includes entries of Records for all transactions that have already started checking for conflicts but may have not finished updating their write sets and adding information for their write sets to the hash map 812. Again, the storages may be of any type of memory, volatile or non-volatile, including but not limited to random-access-memory, flash memory, magnetic disks, and optical disks. Note that in the sequential solution, there would be at most one such transaction, since the TM would process commit requests in series. In the multi-threaded solution, each thread can account for an active transaction in committing.

The TM may maintain two pointers, P, to the commit log 818. The first pointer, tail 820, points to the record where new transactions are to be appended to the commit log 818. The second pointer, head 822, points the head of active log. All transactions represented by log entries entered prior to the transaction represented by head have already either finished updating the hash map or aborted due to conflict. Those of ordinary skill in the art understand that all log entries entered prior to head may be removed and the storage space occupied by those entries may be returned to the operating system. Although the commit log 818 is a logically continuous collection of records, the operating system of the TM may keep them physically in non-continuous spaces in either volatile or nonvolatile memory and when necessary, garbage collection process well known in the art may be carried out to compact the physical commit log. As will become clearer later, the log 818 and associated tail and head pointers 820 and 822 allow commit requests and conflict detections to be executed concurrently and lock-free.

Figure 9:
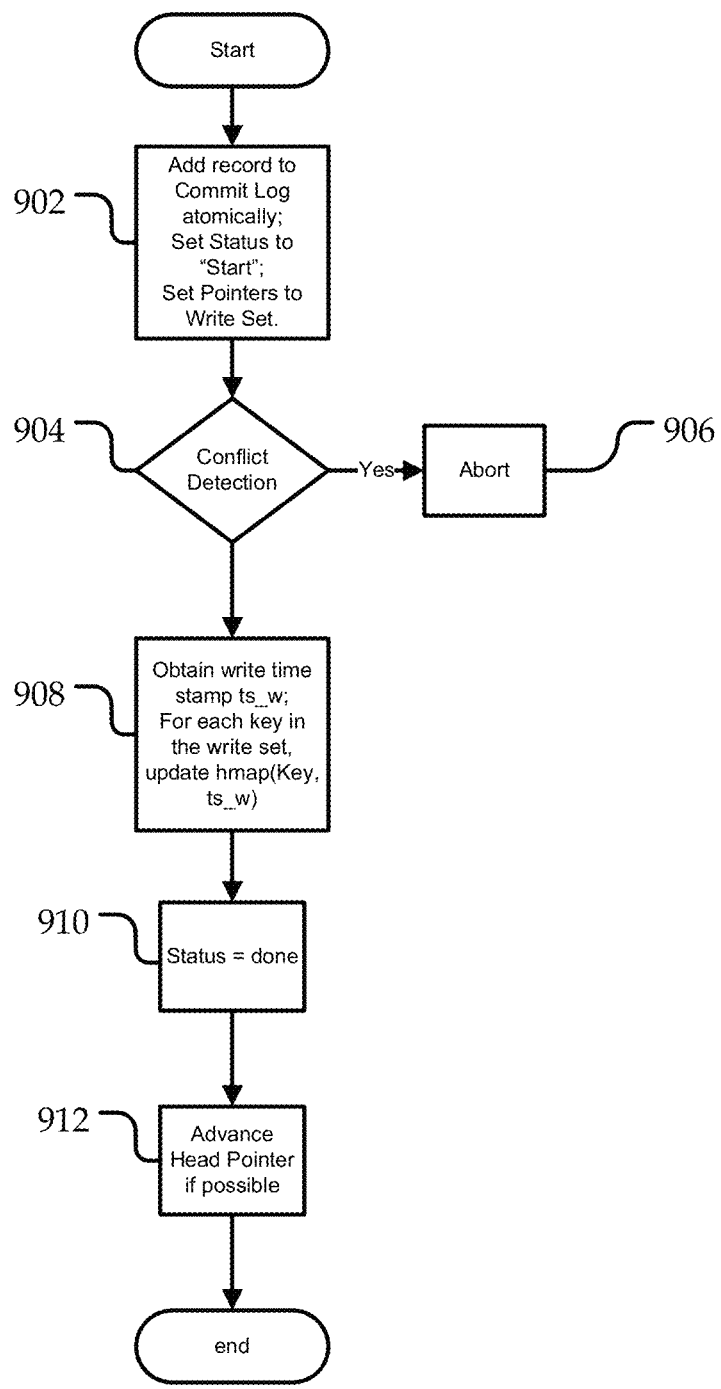
FIG. 9 is a flow chart for handling data commit requests from concurrent transactions by a transaction manager.

FIG. 9 shows an exemplary procedure of handling requests to commit in parallel for the TM embodiment described above. Upon receiving a request to commit from a transaction having a transaction identifier, txid, the TM creates a log Record for txid, R_txid, and appends it to the commit log at step 902. Specifically, the TM sets the wset field of R_txid to point to the write set of the transaction with the ID txid and initiates the status field of R_txid to started. The tail pointer is set to point to this new entry in the commit log. The entry is added to the commit log atomically, using well known atomic execution techniques such as Compare-And-Swap (CAS) and lock.

At Step 904, the TM performs conflict detection. If the TM determines that the write set of transaction txid conflicts with at least one other concurrent transaction, the transaction is aborted at step 906 and the status field of the record R_txid is set to done. Other status field, such as aborted may alternatively be used. At step 908, if the TM determines that there is no conflict, it then proceeds to commit updates of txid, obtain commit timestamp, updates the ts_w field of log record R_txid, and updates the hash map to include the newly updated write set data keys and the commit time ts_w. At step 910, the TM set the status field of R_txid to done. At Step 912, the TM determines whether the head pointer to the commit log can be advanced. Specifically, if the status fields of all commit log entries between the R_txid and current head is done (or aborted, if aborted is used in the status field for aborted transactions), the head pointer advance to R_txid. The execution of steps 904 through 912 needs not to be atomic. In other words, these operations can be executed in a TM thread that is concurrent with other threads handling commit requests for other transactions.

Figure 10:
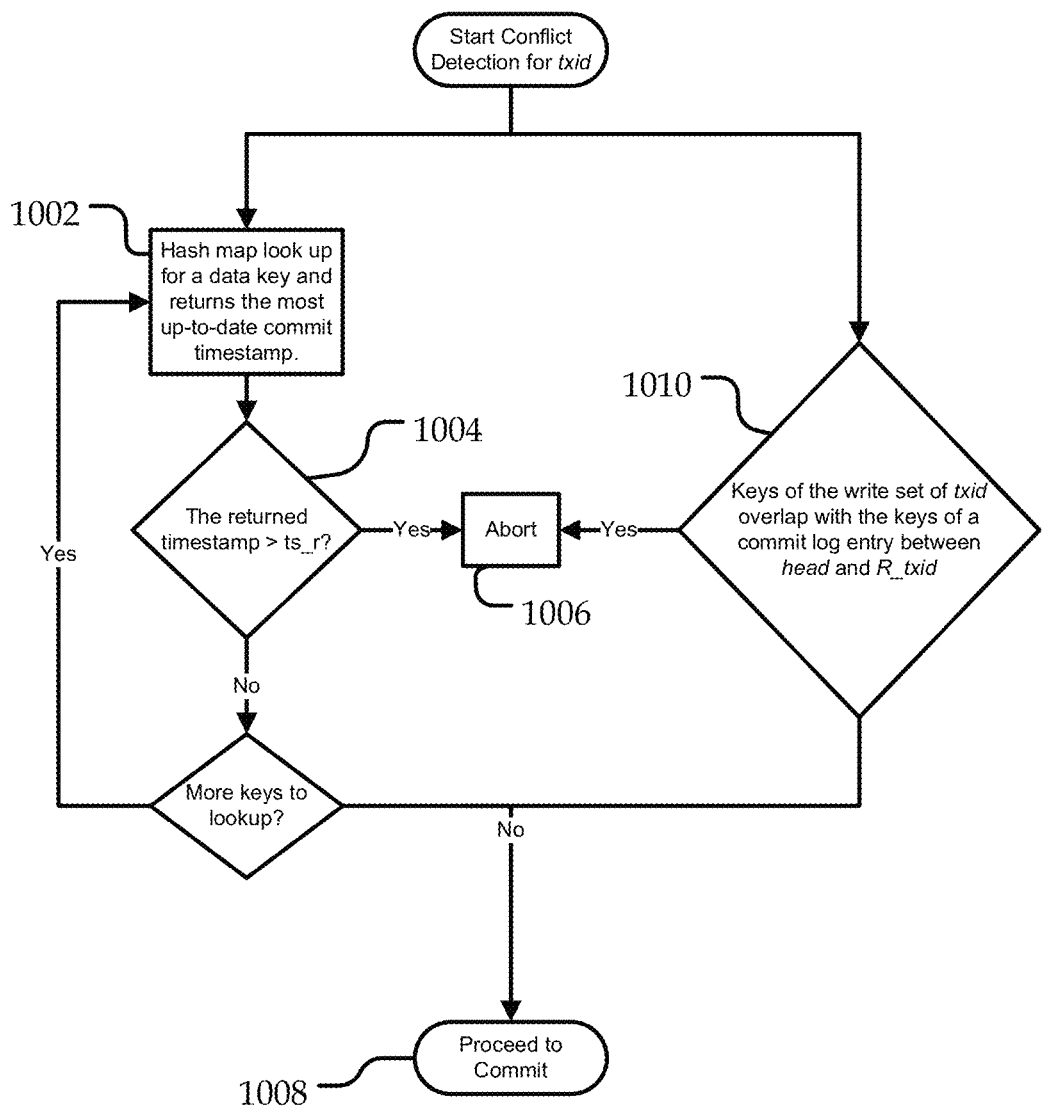
FIG. 10 is a flow chart of concurrent data conflict detection between transactions for an exemplary transaction manager in snapshot isolation.

An embodiment for the step of conflict detection 904 is further illustrated in FIG. 10. In this embodiment, the TM performs two conflict detections. The first conflict detection is based on hash map lookup, as discussed earlier. Specifically, each key of the write set of transaction txid is passed to the hash map for a look up and return of the most up-to-date commit timestamp of the data identified by the key at step 1002. A returned timestamp for a data key is compared to the start time ts_r of the transaction txid in step 1004. A returned timestamp that is later than ts_r suggests that the transaction txid overlaps spatially and in time with at least one other transaction and has started earlier than a committed update of the data identified by the key by that other transaction. If that is the case and according to the SI criterion described earlier, conflict thus exist and transaction txid may abort at step 1006 to avoid violation of ACID. Note that the lookup of keys takes O(1) time since it is implemented as a hash table. In addition, the number of log entries checked is roughly the number of commit threads, which is quite small (4, 8 or at most 16 in today's architectures). Thus, the hash map method of conflict detection provides speedy lookup. However, as described earlier, this speedup may be slightly compromised by occasional false conflict determinations and unnecessary abort because the data key and the latest commit timestamp is not a one-to-one correspondence in the hash map.

The second conflict detection of FIG. 10 utilizes the commit log to guarantee ACID of transactions even if steps 904 through 912 described for FIG. 9 are executed for each transaction concurrently. For this second conflict detection, the TM does not check any timestamps and only determines whether the keys of the write set of the transaction txid overlap with the keys of a commit log entry between the head and R_txid at step 1010. If there is an overlap, then the TM assumes that transaction txid is in conflict with other concurrent transactions and is aborted at step 1006. Because it is possible that all transactions with overlapping write set with transaction txid in between the head and R_txid may have already finished updating the data item in the database before the start time ts_r of transaction txid (and thus not in conflict with transaction txid according to the time overlap criterion of SI conflict), this second conflict detection may yield false conflicts and unnecessary aborts for the gain of implementation simplicity. The two conflict detection procedures above are complementary. They together guarantee detection of all conflict although both may yield false positives. After the TM has determined that neither the first nor the second types of conflict exists, the TM may proceed to commit the updates by txid at step 1008.

The above implementation of scalable and parallel conflict detection may be implemented in Yahoo! Omid using the exemplary codes below

```
new Wset ~ T. writeset
new record rec including pointer to Wset, status = started
atomically add rec to committing // e.g., using CAS or lock
// conflict detection
for each key in T.writeset {
    // conservative check (no timestamp) wrt log entries
    if key is in wset of a log entry between head and rec then
        rec. status ← done
        return abort
    // check conflicts wrt done transactions using hmap
    if hmap(key) > T.ts_r then
        rec. status ← done
        return abort
}
// check was successful - obtain commit timestamp and commit
ts_w ← FETCH_AND_INCREMENT (last_committed)
rec.status ← committed
rec. ts_w ← ts_w
// add write-set to hmap one record at a time - not atomic for each key in
for each key in T.writeset {
    T.writeset
    hmap.put (key, ts_w)
```

```
}
rec. status ← done
// advance done pointer if possible
if for all entries from rec to head, status = done then head ← rec
return ts_w
```

Figure 11:
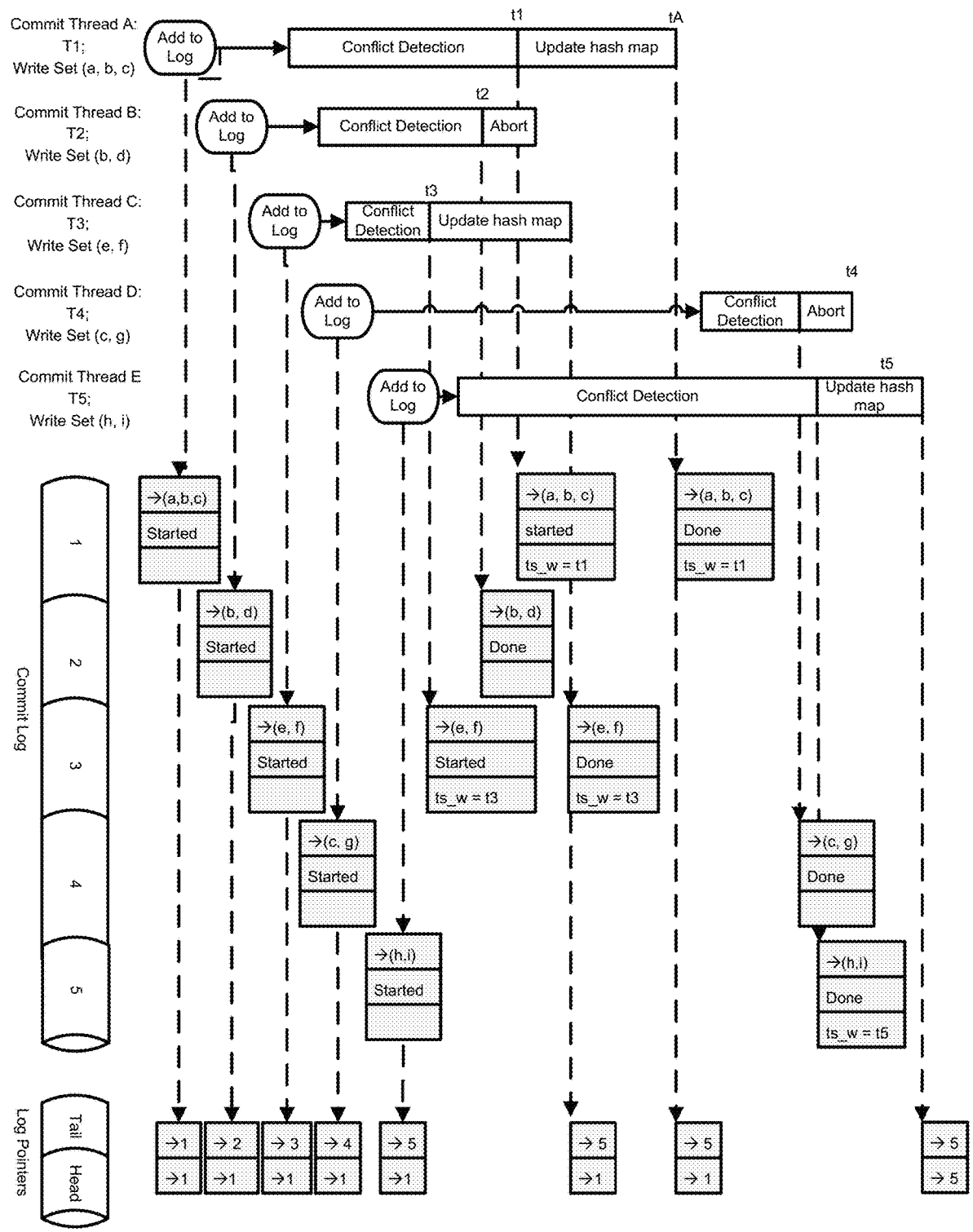
FIG. 11 shows a detailed example of the working of the exemplary system for concurrent conflict detection of FIG. 8 and the corresponding flow chart of FIGS. 9 and 10.

The above TM operations for concurrent handling of commit requests can be better understood by the exemplary process flow illustrated in FIG. 11. In FIG. 11, the execution of concurrent commit requests and modification of the commit log and log pointers are shown in detail. The process flows from left to right in time. Transactions T1 through T5 make commit requests to the TM respectively via thread A through E. The TM appends commit log records for T1 through T5 into the commit log as entries 1 through 5. The head pointer is initiated to point to T1, and the tail pointer moves from T1, through T2, T3, and T4 to T5 as each log entry is appended to the commit log. Because log entries may be appended to the commit log atomically, these processes of adding log entries do not overlap in time. The exemplary write sets of T1 through T5 are (a, b, c), (b, d), (e, f), (c, g), and (h, i), respectively and pointers to these write sets are added to the commit log entries 1 to 5. All status fields of the log entries 1 through 5 are initially set as started and no commit timestamp is set initially. In this example, the write sets of transaction T1 and T2, T1 and T4 overlap spatially and thus may potentially be in conflict.

Each one of transactions T1 through T5 then begins conflict detection procedure. Conflict detections do not need to be carried out atomically. Thus, conflict detections within thread A through thread E are scheduled to be executed by the operating system concurrently. In this example, the conflict detections are scheduled in the order of T1, T2, T3, T5, and T4.

In this exemplary embodiment, T3 finishes its conflict detection first at timestamp t3. Because the hash map is empty initially and no commit timestamps in the commit log by t3 is after the ts_r time of T3, T3 is not in conflict with any other transaction. The TM thus proceeds to commit the write set of T3. The commit log entry 3 is updated with commit timestamp t3. With this update, it is not possible for any other transaction to pass conflict detection if they spatially overlap with T3 and has a ts_r time earlier than t3 at least until the TM finishes updating the hash map to reflect the write set of T3 and updated the status field of commit log entry 3 to done.

The next transaction to finish conflict detection is T2 at time t2. Under the second of the two conflict detection procedure, the write set of T2 conflict with T1 because at time t2, one of the data item in T2's write set, b, is in the write set of T1, which is between the head, entry 1, and the tail, entry 5. Thus, T2 aborts and the status field of commit log entry 2 is set to done.

The next transaction to finish conflict detection is T1 at time t1. T1 passes first of the two conflict check procedures because the hash map does not contain keys to any of the data items in the write set of T1 (assuming that the hash map check does not make false conflict detection). Further, T1 passes the second of the two conflict detection procedures because there are no other entries in the commit log between the head (entry 1) and entry 1. The TM thus updates the commit time field of entry 1 in the commit log to t1 and proceeds to commit the write set of T1 and update the hash map. Once the hash map update is finished, the status field of entry 1 in the commit log is changed from started to done.

Note that conflict detection for T4 starts later than T5 in thread D but may be executed faster and finish before conflict detection for T5. T4 spatially overlap with T1 due to the common write set data item c. T4 starts conflict detection after T1 has updated the hash map. In addition, at the time for T4's conflict check, the tail pointer is at entry 5 and head pointer is at entry 1. As a result, T4's conflict detection is positive for both the first and second conflict detection procedures. Thus, at time t4, the TM proceeds to abort T4 and update the status field of entry 4 to done.

For each of T1 through T4, it is not possible to advance the head pointer according to step 912 of FIG. 9. Thus, the head pointer remains at entry 1 even after T1 has completed updating the hash map at time tA.

The next transaction to finish conflict check is T5 at time t5. T5 has no spatial overlap with any of the other proceeding transactions and thus will pass both the first and second conflict detection procedure (assuming that the hash map look up does not turn out false conflict detection). The TM thus updates the commit timestamp of commit log entry to t5, proceeds to commit the write set of T5, and updates the hash map. After the hash map update, thread E proceeds to determine whether it is possible to advance the head pointer. Because by the time that T5 has updated the hash map, the status fields of log entries 1 through 4 are all set to done, the TM determines to advance the head pointer to 5. Thus, at the end of the above operations, both the head and tail pointers are set to entry 5. Storage spaces occupied by entries 1 through 4 in the commit log may now be returned to the operating system.

In the scalable and parallel conflict detection embodiments above based on the hash map and commit log, the wset field in each log entry can be further replaced by a Bloom filter for each transaction with a large write set. A Bloom filter is a space-efficient probabilistic data structure that is used to test whether an element is a member of a set. False positive matches are possible, but false negatives are not. Thus a Bloom filter has a 100% recall rate. In other words, a query returns either "possibly in set" or "definitely not in set". Note that the wset field of the log entry for a transaction T is only used by other transactions to check for conflicts with T. Representing T's wset as a Bloom filter saves memory while continuing to ensure safety, at a slight cost of potential false aborts in cases of false positives.

For the embodiments described above, some slow threads may hold up the commit log, causing much conflict for later transactions. It is possible and helpful for the TM to add an optional helping thread. For example, once a slow TM thread a transaction has obtained a write timestamp and ready to commit, the TM may assign the rest of the committing actions, such as adding keys, commit timestamp to the hash map, and advancing the pointers, to the helping thread. This helping procedure is safe, since all steps are idempotent.

Figure 12:
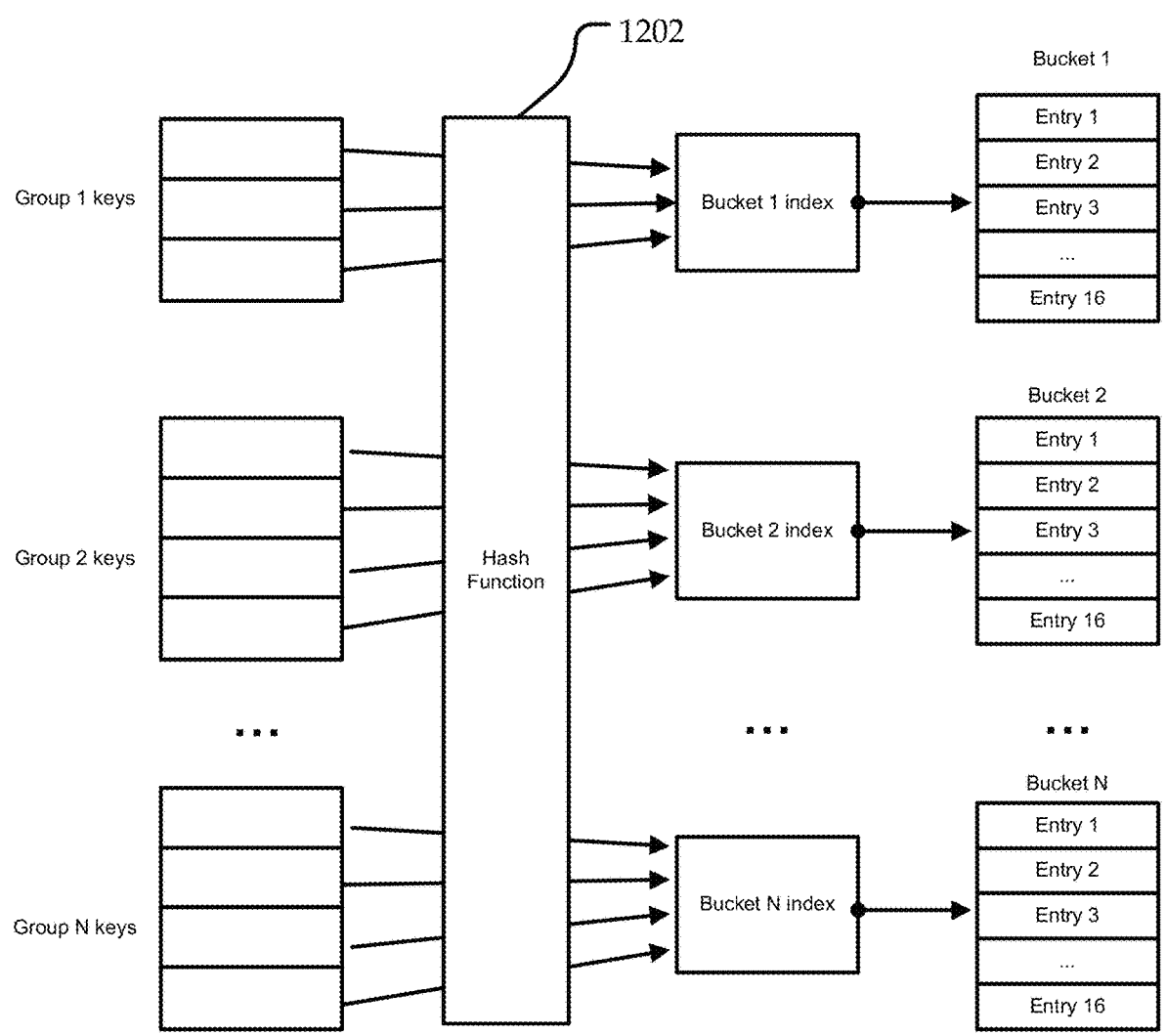
FIG. 12 shows rehashing of data keys into buckets of predetermined size.
Figure 13:
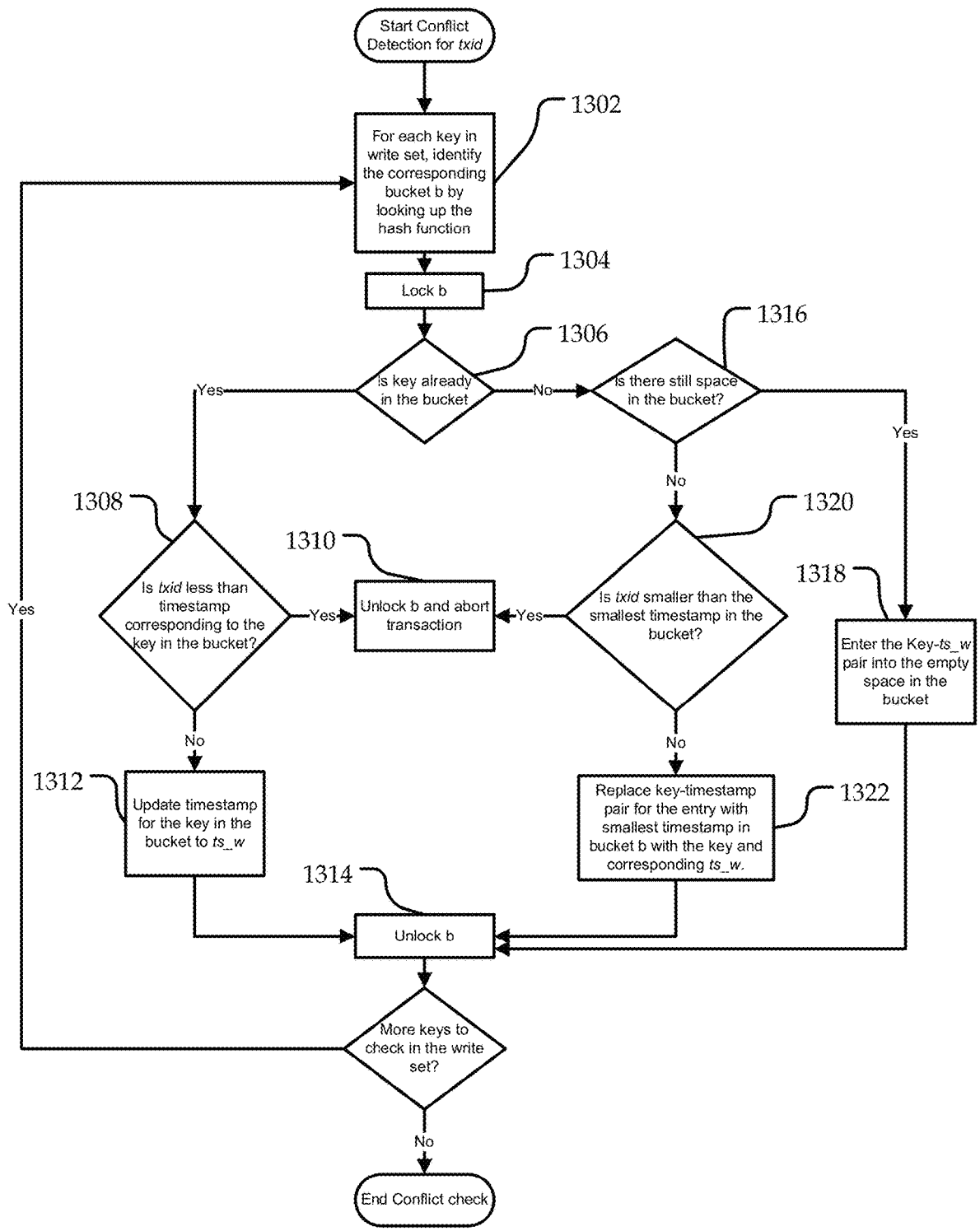
FIG. 13 shows a flow chart of another embodiment of concurrent conflict detection based on hash buckets.

Another embodiment for concurrent conflict detection based on hash function only rather than a hash map and a commit log is illustrated in FIGS. 12 and 13. Again, the TM's capability is scaled by running multiple instances of conflict detection for different transactions in separate threads. Conflict detection is done using a hash table in a main memory. In an exemplary embodiment, every 64-bit key hash is re-hashed into a bucket in an in-memory table. A bucket contains an array of pairs consisting of a 64-bit key hash and the ts_w of the transaction that last wrote this key. Specifically as shown in FIG. 12, the hash function 1202 maps a groups of keys (group 1 through N) to bucket 1 through N. Every bucket is associated with a space in memory that is capable of holding multiple entries of key-ts_w pairs. It will become apparent from later description that the number of entries of each bucket may be capped at, for example, 16, such that the overall memory space needed for all buckets may be bound. Thus, the number of keys in groups 1 through N may be larger than the number of entries available in their corresponding buckets. As will be described later, entry space holding old key-ts_w pairs in a bucket may be recycled in a procedure resembling a garbage collection within the bucket.

The conflict detection function for this embodiment validates that none of the key hashes in the write set have versions larger than the start time of the transaction, txid. If that is the case, the TM update the hash table entries pertaining to the write set to the transaction's newly assigned ts_w. The challenge, however, is that this may need to be done atomically, so that two transactions committing in parallel do not miss each other's updates. As described previously, atomicity may be achieved by using locks on the hash map for the duration of the conflict detection procedure. But using such sequential scheme would limit concurrency and would not allow the TM to scale-up.

The embodiment of FIGS. 12 and 13 achieves concurrency in conflict detection by limiting the granularity of atomicity to a single bucket: for each key hash in the write-set, only the corresponding bucket is locked during the conflict detection against that key. Locking at the bucket level increases concurrency because other transactions from different threads may simultaneously run conflict detection against other buckets and there would be no holdups between buckets. In the situation where a transaction's write set is hashed across multiple buckets (and thus the TM may need to check against these multiple buckets for confliction detection) and there are conflicts in some buckets and no conflict for some other buckets, the embodiment of FIGS. 12 and 13 would update the key-timestamp pair for the key having no conflict in the corresponding bucket. But because the transaction will eventually be aborted later due to the conflict against other buckets, the update of the non-conflicting bucket would be a false update. However, this false update can only potentially lead to false conflict detection and false aborts of transactions later. As discussed earlier, false aborts do not lead to violation of ACID and may be considered a small price to pay for increased concurrency. Furthermore, since abort rates are low, such spurious additions rarely induce additional aborts due to false conflicts.

The conflict detection procedure for the embodiment above is shown in FIG. 13. Upon conflict detection request from a thread of a transaction, each key of the write set of the transaction is input into the hash function and the bucket corresponding to the key is identified in step 1302. The bucket is then locked for this transaction at step 1304. In step 1306, the TM then checks to see if the key is among the entries of key-ts_w pairs already entered into the bucket. If the answer is yes, the TM compares the txid of the transaction to the timestamp, ts_w, for the key in the bucket in step 1308. If txid<ts_w, then the TM determine there is a conflict (because the transaction has read the data corresponding to the key prior to a later update of the data) and the bucket is unlocked followed by an abortion of the transaction in step 1310. If no conflict detection is found, the TM optimistically updates the timestamp of the key in the bucket with the new ts_w in step 1312 followed by unlocking the bucket in step 1314. Again, this update might be a false update because the transaction may be eventually aborted due to conflict against other buckets. But it will not jeopardize ACID of later transactions.

At step 1306, if the TM finds that the key is not in the bucket, then the TM determines in step 1316 whether there is still empty space in the bucket to hold the new key-ts_w pair. If yes, then the key-ts_w is entered into the bucket in step 1318 followed by unlocking the bucket in step 1314.

If the TM determines in step 1316 that the bucket is full and there is no empty space for the key-ts_w pair, then the TM initiates a procedure that resembles a garbage collection within the bucket in steps 1320 and 1322. Particularly in step 1320, txid is compared against the smallest timestamp in the bucket (representing the entry that is the oldest in the bucket). If the txid is smaller than the smallest timestamp, the bucket is unlocked and the transaction is aborted in step 1310. If the txid is not smaller than the smallest timestamp, then the oldest entry in the bucket is replaced by the new key-ts_w pair in step 1322 followed by unlocking the bucket in step 1314.

The procedure of conflict detection above overcomes the challenge in limiting the hash table size by garbage-collecting information pertaining to old commits within each bucket. Since a transaction needs only to check for conflicts with transactions whose ts_w exceeds its txid, it is safe to remove all entries that have commit times older than the txid of the oldest active transaction. Unfortunately, this observation does not give rise to a feasible garbage collection rule: though transactions usually last 10-20 ms, there may not be any upper bound on a transaction's life span, and it may be difficult for the TM to know whether a given outstanding transaction will ever attempt to commit. Instead, the garbage collection procedure illustrated above uses a much simpler policy of restricting the number of entries in a bucket. Each bucket holds a fixed array of pairs (e.g., 16, any other predetermined number may be used). During conflict detection, if a key appears in a bucket with a lower timestamp than txid, its value field is over-written. Otherwise, the update over-writes the oldest entry in the bucket. Since this may cause conflicts with older transactions to be missed, a transaction also aborts in case the minimal timestamp in the bucket exceeds its txid. In other words, a transaction expects to find, in a bucket it checks, at least one commit timestamp older than its start time, and if it does not, it aborts.

The size of the hash table is chosen so as to reduce the probability for spurious aborts, which is the probability of all keys in a given bucket being replaced during a transaction's life span. If the throughput is X transactional updates per second, a hash table with E entries will overflow after E/X seconds on average. For example, if 10 million keys are updated per second, a one-million-entry table will overflow only after 100 ms on average, which is much longer than most transactions.

The conflict detection and garbage collection procedure based on FIG. 12, FIG. 13, and the description above may be implemented by the following pseudo code:

```
procedure CONFLICTDETECT(txid,write-set)
    for all key within the write-set do
        b ←key's bucket
        lock b
        small ←entry with smallest timestamp in b
        if timestamp for key > txid then
            unlock b
            return ABORT
        if timestamp for key < txid then
            overwrite (key, timestamp) with (key, ts_w)
            unlock b
            continue to do loop
        if b has empty space then
            enter (key, ts_w) into b
            unlock b
            continue to do loop
        if small.timestamp > txid then
            unlock b
            return ABORT
        overwrite small with (key, ts_w)
        unlock b
    return COMMIT
```

The above scalable and multi-threaded conflict detection approaches may be compared to sequential conflict detection schemes in some realistic applications. For example, with up to 4 threads, tests show that the throughput scale-up for the hash map and commit log approach is close to linear (3.7x compared to the sequential algorithm). The throughput improvement is mainly due to the statistical fact that committing threads do not conflict most of the time and can commit concurrently. In a sequential conflict detection scheme, the conflicts would have to be detected for all the transactions sequentially in a single thread even though most of the time no conflict exists.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The invention claimed is:

1. A method, comprising:
   receiving concurrent requests to commit data updates of data items in a database supporting multi-versioning, wherein each request corresponds to one of a plurality of transactions isolated by snapshot isolation in the database and each request is made for committing a write set of data items of the corresponding one of the plurality of transactions, wherein a write set of a transaction is a set of data items that the transaction updates, and wherein each data item in the database is identified by a unique data key;
   tracking commits for one or more data updates using commit timestamps;
   maintaining in one or more memories a hash map between data keys of committed data items and corresponding commit timestamps;
   concurrently handling (i) a first request, of the concurrent requests, corresponding to a first transaction of the plurality of transactions and (ii) a second request, of the concurrent requests, corresponding to a second transaction of the plurality of transactions, the concurrently handling comprising concurrently:
   (i) performing a first type of data conflict detection for the first transaction based on at least looking up, in the hash map, first commit timestamps for a first write set of the first transaction; and (ii) performing the first type of data conflict detection for the second transaction based on at least looking up, in the hash map, second commit timestamps for a second write set of the second transaction, the concurrent handling further comprising performing a second type of data conflict detection for the first transaction based on log entries;

determining a hash bucket corresponding to a data key by computing a hash index of the data key using a hash function;

locking the hash bucket;

determining whether the data key is in the hash bucket;

responsive to determining that the data key is not in the hash bucket, determining whether the hash bucket contains empty space;

responsive to determining that the hash bucket contains no empty space, replacing a first entry having a smallest timestamp with an entry pair comprising the data key and a timestamp of at least one of the plurality of transactions;

unlocking the hash bucket; and initiating a helping thread that takes over and helps speed up execution of a slow executing thread, of a plurality of threads, associated with a delay of a commit log associated with the log entries.

2. The method of claim 1, comprising:

performing the second type of data conflict detection for the first transaction based on at least checking a log comprising the log entries tracking one or more statuses of one or more transactions associated with one or more requests to commit; and responsive to determining that the first transaction passes both the first type of data conflict detection and the second type of data conflict detection, committing one or more data updates associated with the first transaction.

3. The method of claim 1, wherein the commit timestamps are derived from a central logical clock, wherein performing the first type of data conflict detection for the corresponding one of the plurality of transactions based on the hash map comprises:

inputting to the hash map one or more data keys from the write set of the corresponding one of the plurality of transactions;

returning from the hash map one or more commit timestamps for data items identified by the one or more data keys; and determining that data conflict exists for the corresponding one of the plurality of transactions when one of the one or more commit timestamps is later than a start time of the corresponding one of the plurality of transactions, wherein a start time of at least one transaction is associated with the timestamp for a snapshot of the at least one transaction in the database supporting snapshot isolation of transactions.

4. The method of claim 3, further comprising:

maintaining in the one or more memories a log that holds a plurality of entries, wherein each entry of the plurality of entries is a data structure for one of the plurality of transactions, the data structure comprising:

a field for a pointer to the write set of the one of the plurality of transactions;

a field for a commit status of the one of the plurality of transactions; and a field capable of storing a commit timestamp for the write set of the one of the plurality of transactions.

5. The method of claim 4, further comprising:

appending an entry to the log atomically for one or more transactions when a request to commit is received for the one or more transactions.

6. The method of claim 5, further comprising:

maintaining a head pointer that keeps track of a head entry in the log; and maintaining a tail pointer marking a last appended entry in the log, wherein the head entry is determined such that requests to commit by all transactions corresponding to log entries appended to the log prior to the head entry are completed; and wherein one or more log entries outside the head pointer and the tail pointer are freed and released.

7. The method of claim 6, wherein performing the second type of data conflict detection for the first transaction based on the log entries comprises:

checking for data key overlap between the write set of the first transaction and write sets of all log entries between the head pointer and an entry for the first transaction; and determining that a second type of data conflict exists for the first transaction when there is overlap.

8. The method of claim 7, further comprising causing a commit in the database of the write set of the first transaction and updating the hash map to reflect the first commit timestamps of the first write set, when neither a first type of data conflict nor the second type of data conflict is detected for the first transaction.

9. The method of claim 7, further comprising causing the one of the plurality of transactions to abort when either at least one first type or second type of conflict exists for the one of the plurality of transactions.

10. The method of claim 1, further comprising:

maintaining a head pointer that keeps track of a head entry in a log in the one or more memories; and maintaining a tail pointer marking a last appended entry in the log.

11. The method of claim 1, wherein the slow executing thread is associated with at least one of adding keys or advancing pointers.

12. The method of claim 1, comprising:

responsive to determining that the first transaction passes at least one of the first type of data conflict detection or the second type of data conflict detection, committing one or more data updates associated with the first transaction.

13. A data transaction manager comprising:

a processor; and memory comprising instructions that, when executed by the processor, implement:

a multi-thread operating system;

a program interface configured to receive concurrent requests to commit data updates of data items in a database supporting multi-versioning, wherein each request is made by one of a plurality of transactions isolated by snapshot isolation in the database and each request is made for committing a write set of data items of the one of the plurality of transactions, wherein a write set of a transaction is a set of data items that the transaction updates, and wherein each data item in the database is identified by a unique data key;

a logic clock for tracking commit timestamps for committed data items;

a hash map between data keys of one or more committed data items and corresponding commit time stamps, wherein the multi-thread operating system supports a plurality of threads concurrently handling at least one of the concurrent requests, the concurrently handling comprising concurrently:
(i) performing a first type of data conflict detection for a first transaction based on at least looking up, in the hash map, first commit timestamps for a first write set of the first transaction; and
(ii) performing the first type of data conflict detection for a second transaction based on at least looking up, in the hash map, second commit timestamps for a second write set of the second transaction;

a first component for determining whether a data key is in a hash bucket;

a second component for responsive to determining that the first transaction passes at least the first type of data conflict detection, committing one or more data updates associated with the first transaction;

a third component for responsive to determining that the data key is not in the hash bucket, determining whether the hash bucket contains empty space; and a fourth component for responsive to determining that the hash bucket contains no empty space:
comparing a timestamp of at least one of the plurality of transactions with a smallest timestamp in the hash bucket;
determining whether the timestamp of at least one of the plurality of transactions is smaller than the smallest timestamp in the hash bucket;
when the timestamp of at least one of the plurality of transactions is smaller than the smallest timestamp in the hash bucket, unlocking the hash bucket comprising the smallest timestamp that is larger than the timestamp of at least one of the plurality of transactions;
when the timestamp of at least one of the plurality of transactions is not smaller than the smallest timestamp in the hash bucket, replacing a first entry having the smallest timestamp with an entry pair comprising the data key and the timestamp of at least one of the plurality of transactions; and
initiating a helping thread that takes over and helps speed up execution of a slow executing thread, of a plurality of threads, associated with a delay of a commit log associated with log entries.

14. The data transaction manager of claim 13, further comprising a log that holds a plurality of entries, wherein each entry is a data structure corresponding to one of the plurality of transactions, the data structure comprising:
a field for a pointer to at least one write set of the one of the plurality of transactions;
a field for a commit status of the one of the plurality of transactions; and
a field capable of storing a commit timestamp derived from the logic clock for the at least one write set of the one of the plurality of transactions.

15. The data transaction manager of claim 14, wherein a log entry for a transaction is appended to the log atomically when a request to commit is made by the transaction.

16. The data transaction manager of claim 15, further comprising:
a head pointer that keeps track of a head entry in the log; and
a tail pointer marking a last appended entry in the log,
wherein the head entry is determined such that requests to commit for all transactions corresponding to log entries appended to the log prior to the head entry have been completed; and
wherein one or more log entries outside the head pointer and the tail pointer are freed and released to the multi-thread operating system.

17. The data transaction manager of claim 16, wherein the concurrent handling of one of the concurrent requests further comprises performing a second type of data conflict detection for the first transaction based on the log entries between the head entry and an entry for the first transaction.

18. A data access and management system comprising the data transaction manager of claim 17, the data access and management system further comprising:
the database;
a plurality of client devices;
a first client API residing on the plurality of client devices for sending a plurality of requests to commit to the program interface of the data transaction manager; and
a second client API residing on the plurality of client devices for interacting with the database.

19. A data access and management system comprising the data transaction manager of claim 13, the data access and management system further comprising:
the database;
a plurality of client devices;
a first client API residing on the plurality of client devices for sending a plurality of requests to commit to the program interface of the data transaction manager; and
a second client API residing on the plurality of client devices for interacting with the database.

20. A data transaction manager comprising:
a processor; and
memory comprising instructions that, when executed by the processor, implement a method comprising:
receiving concurrent requests to commit data updates of data items in a database supporting multi-versioning, wherein each request corresponds to one of a plurality of transactions isolated by snapshot isolation in the database and each request is made for committing a write set of data items of the corresponding one of the plurality of transactions, wherein a write set of a transaction is a set of data items that the transaction updates, and wherein each data item in the database is identified by a unique data key;
tracking commits for one or more data updates using commit timestamps;
maintaining in one or more memories a hash map between data keys of committed data items and corresponding commit timestamps;
concurrently handling (i) a first request, of the concurrent requests, corresponding to a first transaction of the plurality of transactions and (ii) a second request, of the concurrent requests, corresponding to a second transaction of the plurality of transactions, the concurrently handling comprising concurrently:
(i) performing a first type of data conflict detection for the first transaction based on at least looking up, in the hash map, first commit timestamps for a first write set of the first transaction; and
(ii) performing a second type of data conflict detection for the second transaction based on at least looking up, in the hash map, second commit timestamps for a second write set of the second transaction, the concurrent handling further comprising performing a second type of data conflict detection for the first transaction based on log entries;

responsive to determining that the first transaction passes at least the first type of data conflict detection, committing one or more data updates associated with the first transaction;

determining a hash bucket corresponding to a data key by computing a hash index of the data key using a hash function;

locking the hash bucket;

determining whether the data key is in the hash bucket;

responsive to determining that the data key is not in the hash bucket, determining whether the hash bucket contains empty space;

responsive to determining that the hash bucket contains no empty space, replacing a first entry having a smallest timestamp with an entry pair comprising the data key and a timestamp of at least one of the plurality of transactions;

unlocking the hash bucket; and initiating a helping thread that takes over and helps speed up execution of a slow executing thread, of a plurality of threads, associated with a delay of a commit log associated with the log entries, wherein at least one request of the concurrent requests is handled based on at least one thread of the plurality of threads.

21. A method for managing data conflict for concurrent data transactions, the method comprising:

receiving concurrent requests to commit data updates of data items in a database supporting multi-versioning, wherein each request corresponds to one of a plurality of transactions isolated by snapshot isolation in the database and each request is made for committing a write set of data items of the corresponding one of the plurality of transactions, wherein a write set of a transaction is a set of data items that the transaction updates, and wherein each data item in the database is identified by a unique data key;

tracking commits for one or more data updates using commit timestamps;

maintaining in one or more memories a hash map between data keys of committed data items and corresponding commit timestamps;

concurrently handling (i) a first request, of the concurrent requests, corresponding to a first transaction of the plurality of transactions and (ii) a second request, of the concurrent requests, corresponding to a second transaction of the plurality of transactions, the concurrently handling comprising concurrently:

(i) performing a first type of data conflict detection for the first transaction based on at least looking up, in the hash map, first commit timestamps for a first write set of the first transaction; and (ii) performing the first type of data conflict detection for the second transaction based on at least looking up, in the hash map, second commit timestamps for a second write set of the second transaction, the concurrent handling further comprising performing a second type of data conflict detection for the first transaction based on log entries;

determining a hash bucket corresponding to a data key by computing a hash index of the data key using a hash function;

locking the hash bucket;

determining whether the data key is in the hash bucket;

responsive to determining that the data key is not in the hash bucket, determining whether the hash bucket contains empty space;

responsive to determining that the hash bucket contains no empty space, replacing a first entry having a smallest timestamp with an entry pair comprising the data key and a timestamp of at least one of the plurality of transactions;

unlocking the hash bucket;

initiating a helping thread that takes over and helps speed up execution of a slow executing thread, of a plurality of threads, associated with a delay of a commit log associated with the log entries, wherein the commit timestamps are derived from a central logical clock, wherein performing the first type of data conflict detection for the corresponding one of the plurality of transactions based on the hash map comprises:

inputting to the hash map one or more data keys from the write set of the corresponding one of the plurality of transactions;

returning from the hash map one or more commit timestamps for data items identified by the one or more data keys; and determining that data conflict exists for the corresponding one of the plurality of transactions when one of the one or more commit timestamps is later than a start time of the corresponding one of the plurality of transactions, wherein a start time of at least one transaction is associated with the timestamp for a snapshot of the at least one transaction in the database supporting snapshot isolation of transactions;

maintaining in the one or more memories a log that holds a plurality of entries, wherein each entry of the plurality of entries is a data structure for one of the plurality of transactions, the data structure comprising:

a field for a pointer to the write set of the one of the plurality of transactions;

a field for a commit status of the one of the plurality of transactions; and a field capable of storing a commit timestamp for the write set of the one of the plurality of transactions;

appending an entry to the log atomically for one or more transactions when a request to commit is received for the one or more transactions;

maintaining a head pointer that keeps track of a head entry in the log; and maintaining a tail pointer marking a last appended entry in the log, wherein the head entry is determined such that requests to commit by all transactions corresponding to log entries appended to the log prior to the head entry are completed; and wherein one or more log entries outside the head pointer and the tail pointer are freed and released.

22. The method of claim 21, wherein the performing the second type of data conflict detection comprises:

checking a log comprising the log entries used to perform the second type of data conflict detection for the first transaction.

23. The method of claim 22, wherein the log entries used to perform the second type of data conflict detection for the first transaction track one or more statuses of one or more transactions associated with one or more requests to commit.

24. The method of claim 23, comprising:
   determining that the first transaction passes both the first type of data conflict detection and the second type of data conflict detection.

25. The method of claim 24, comprising:
   committing one or more data updates associated with the first transaction.

* * * * *